Patented Oct. 14, 1930

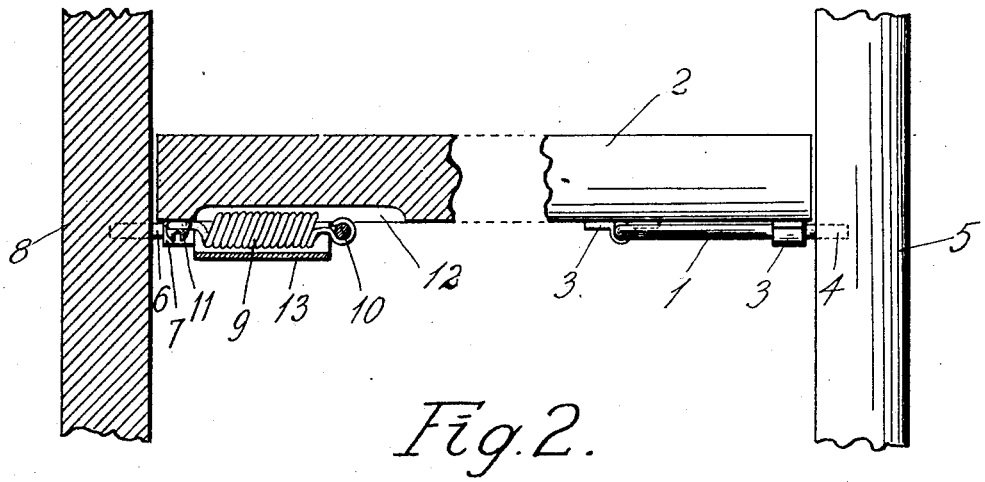
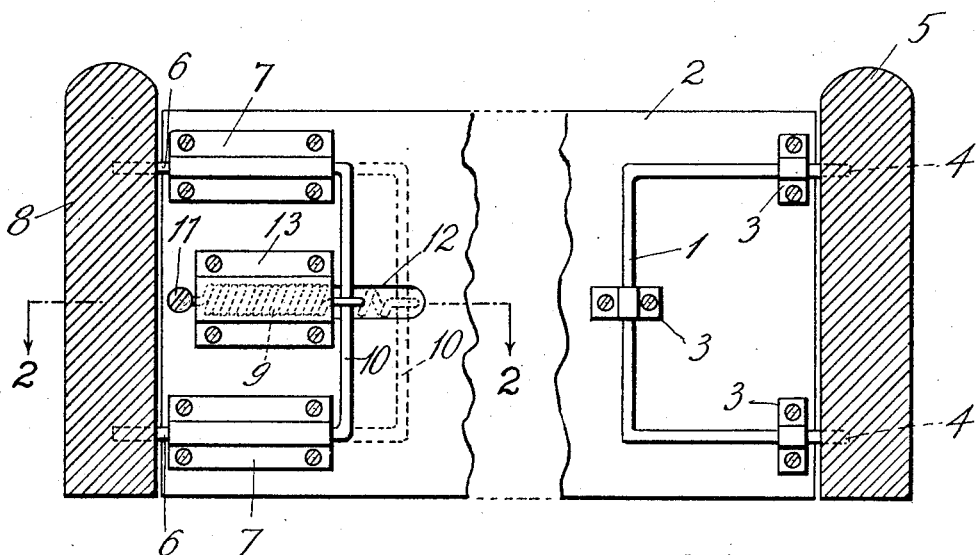

1,778,075

UNITED STATES PATENT OFFICE

FRANCES ROBERT HARRIS, OF PORTLAND, OREGON

SHELF SUPPORT

Application filed December 6, 1929. Serial No. 412,068.

My invention relates to shelf supports in which a bail is attached to each end of a shelf and to the underside thereof—one bail rigidly, the other slidably.

The objects of my invention are to furnish a shelf support which cannot easily be dislodged under vibrations yet permits quick detachment and reattachment.

Other objects and advantages are to be found in the construction and arrangement of parts, as will be described in the specification and particularly pointed out in the appended claims.

I attain these objects with the mechanism illustrated in the accompanying drawing, in which—

Fig. 1 is a bottom view of a shelf with the bails attached thereto.

Fig. 2 is a front elevation, part thereof being in section along the line 2—2 in Fig. 1.

Similar numerals refer to similar parts throughout the several views.

Each bail has a handle portion and two straight ends. One bail 1 is held rigidly to the underside of the shelf 2 by means of the three clamps 3 which engage the handle portion and the straight ends respectively. The terminals of the bail 1 project beyond the end of the shelf 2 and into suitable holes 4 in the side wall 5.

The straight ends 6 of the other bail are held slidably to the underside of the shelf 2 by means of the guide clamps 7. The terminals of this bail also project beyond the end of the shelf 2 and into the side wall 8. The bail is normally held in that position by a helical spring 9 whose one end is hooked to the handle portion 10, while the other end is held by a pin or screw 11 between the straight ends of the bail and near the end of the shelf. A groove 12 in the shelf 2, under the spring 9, provides the necessary clearance for the spring, and at the same time prevents the withdrawal of the straight ends 6 beyond the confines of the guide clamps 7. The cover 13 protects the spring 9 against damage.

In order to release the shelf 2, the handle portion 10 of the bail is withdrawn by hand to the dotted lines 10 in Fig. 1; upon that end of the shelf being lifted, the terminals of the bail 1 will leave their holes 4 in the side wall 5, and the shelf can be removed.

Having thus described my invention, it will be seen that my objects have been accomplished and, though I have shown the preferred form of construction, I reserve to myself the right to make minor changes, providing I do not contravene the spirit and principle of my invention.

I claim:

1. In a shelf support, the combination comprising a shelf, supporting side walls for the shelf, and a bail attached to each end of the shelf and to the underside thereof, one of said bails being mounted slidably and with its terminals normally projecting beyond the end of the shelf into the side wall, the other bail having a handle portion and straight ends, and clamps holding the handle portion and straight ends rigidly to the underside of the shelf, the terminals of the straight ends projecting beyond the end of the shelf into the side wall.

2. In a shelf support, the combination comprising a shelf, supporting side walls for the shelf, and a bail attached to each end of the shelf and to the underside thereof, one of said bails being held rigidly in place, the other bail comprising a handle portion and straight ends, guide clamps covering the straight ends, a helical tension spring hooking with one end to said handle portion, the other end of the tension spring being attached near the end of the shelf between the straight ends, a cover plate for the spring, and a groove in the shelf under the spring, said groove providing clearance for the spring and preventing the withdrawal of the straight ends beyond the confines of the guide clamps, the terminals of said straight ends normally projecting beyond the end of the shelf and into the adjacent side wall.

In testimony whereof I affix my signature.

F. R. HARRIS.